July 17, 1962 A. KÄCH 3,045,193
SWITCHING ARRANGEMENT FOR FREQUENCY STABILIZATION OF FREQUENCY MODULATED SELF-EXCITED TRANSMITTER
Filed Nov. 3, 1959
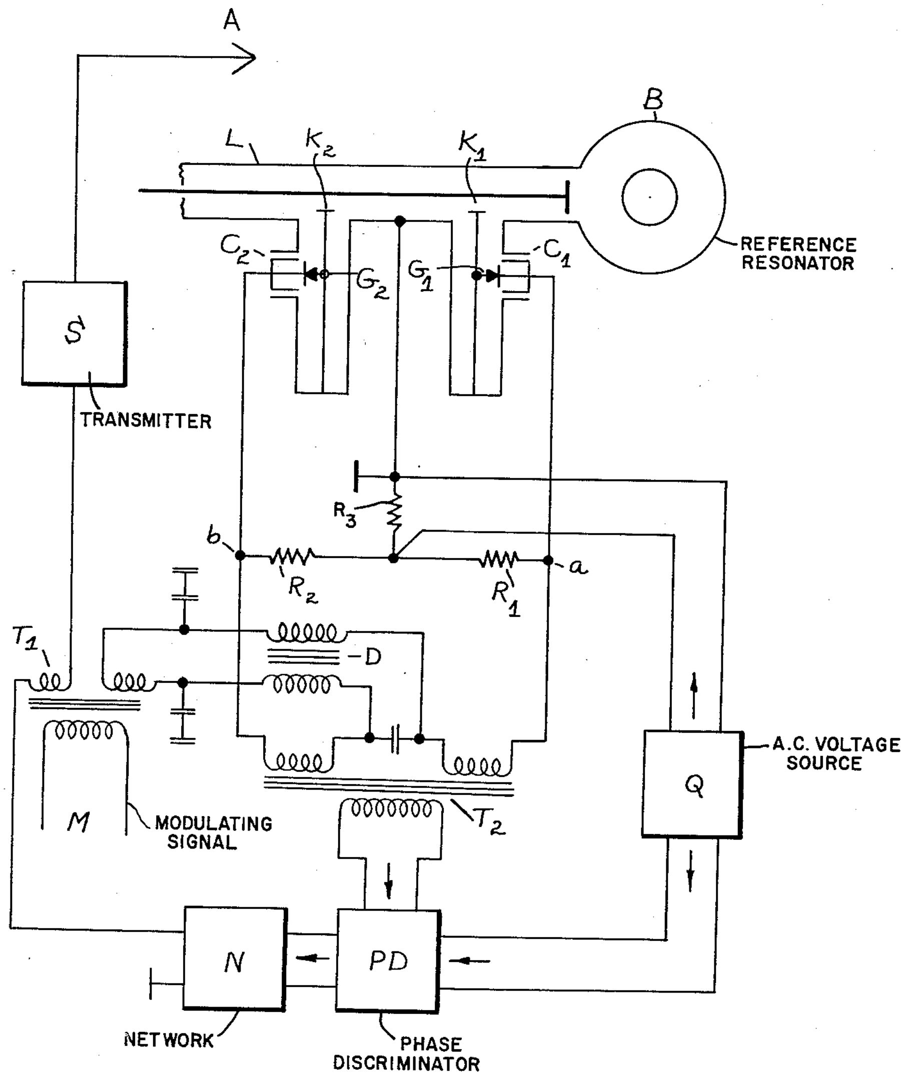
INVENTOR.
Alfred Käch
BY
Pierce Scheffler & Parker
Attorneys United States Patent Office
3,045,193
Patented July 17, 1962

3,045,193

SWITCHING ARRANGEMENT FOR FREQUENCY STABILIZATION OF FREQUENCY MODULATED SELF-EXCITED TRANSMITTER

Alfred Käch, Nussbaumen, Aarg, Switzerland, assignor to Patelhold Patentverwertungs- & Elektro-Holding A.-G., Glarus, Switzerland
Filed Nov. 3, 1959, Ser. No. 850,621
Claims priority, application Switzerland Nov. 15, 1958
2 Claims. (Cl. 332—19)

This invention relates to frequency stabilizing devices and more particularly to an improved arrangement for stabilizing the frequency of frequency-modulated self-excited transmitters.

The stabilization of the frequency of a self-excited transmitter to approximately its normal value can be effected as known by producing, by a discriminator, a regulating voltage which corresponds in size and sign to the difference between the actual, instantaneous transmitter frequency and the characteristic frequency of a reference resonator tuned to the normal value, and by using this regulating voltage to influence the transmitter frequency in the sense of maintaining as small as possible, the difference between the two.

If such a transmitter is frequency-modulated, the modulating signal appears at the output of the discriminator. In order to prevent it from being reduced to zero over the stabilizing circuit for the frequency fluctuation of the transmitter oscillation, the time constant of the stabilizing circuit must be kept sufficiently large. This has the disadvantage that relatively rapid frequency fluctuations, as they can be caused by various interfering influences (for example by humming, microphony, voltage fluctuations in the feeding network, antenna feedback) can no longer be eliminated by the stabilizing circuit.

It is known to avoid this disadvantage by frequency-modulating, in addition to the transmitter, the characteristic frequency of the reference resonator with the same fluctuation. With a small time constant of the stabilizing circuit, one then has a frequency stabilization acting in the sense of a negative feedback, for all frequency variations effected by the modulating signal. By this, there results a linearization of the modulation characteristic. In the known device operating on this principle, the negative feedback is only effective, however, in the lower part of the modulating frequency band; in the vicinity of the upper limit of its range of action, the appearance of modulation distortions has therefore to be anticipated. Great disadvantages of this arrangement are moreover the relatively great expenditure, the difficult balancing and particularly the fact that the quality of the reference resonator as a standard for the mean transmitter frequency is reduced by the necessity of influencing its characteristic frequency by frequency modulation.

The switch arrangement according to the invention yields with little expenditure a satisfactory stabilization of the mean transmitter frequency to its normal value, a negative feedback for all interferences appearing in the modulating frequency range and a linearization of the modulating characteristic over the entire modulating frequency range.

The switch arrangement makes use of a discriminator suggested for frequency stabilization, which contains two rectifiers to each of which is fed a high frequency voltage, and where the rectifier circuits contain a source for an additional alternating voltage whose frequency and amplitude are smaller than the frequency and amplitude respectively of the high frequency voltages. The high frequency voltages can be tapped from two coupling devices, which are provided on a line that is coupled with a reference resonator. One of the high frequency voltages should be proportional to the sum of the voltages of the waves running back and forth on the line, the other proportional to their difference. Such a discriminator yields an alternating voltage whose frequency corresponds to that of the additional alternating voltage and whose amplitude and phase (related to the phase of the additional alternating voltage) correspond in a certain range to the size and sign respectively, of the difference between the transmitter frequency and the characteristic frequency of the reference resonator. This alternating voltage can be conducted over an alternating voltage amplifier and produce in a phase discriminator a regulating voltage that influences the transmitter frequency.

The switch arrangement according to the invention, which contains a discriminator of the above described type, is characterized in that, in addition to the source for the additional alternating voltage, the source of the modulating signal is also connected with the rectifier circuits, the two rectifiers for one source being connected in series, those for the other source in parallel.

The drawing illustrates this measure on the basis of an example, where the current introduced by the modulating signal source into the rectifier circuits traverses the two rectifiers in series, while they are connected in parallel, seen from the source for the additional alternating voltage. The represented example shows a switch arrangement which stabilizes the mean frequency of the self-excited transmitter S, which contains, for example a reflex klystron and which is frequency modulated over the transformer T1 by the modulating signal M to the characteristic frequency of the reference resonator B. This resonator is connected over the concentric line L, for example, by means of a direction coupler (not represented) to the line leading from the transmitter S to the antenna A. On the line L are provided the coupling devices K1 and K2, which tap high frequency voltages from the line and lead them to the rectifiers G1 and G2. One of these high frequency voltages is proportional to the sum of the wave voltages running back and forth on the line L and the other proportional to their difference. The capacitances C1, C2 serve to eliminate the high frequency components. R1 and R2 are working resistances of the rectifiers G1 and G2. One end of resistance R2 is connected to rectifier G2 and one end of resistance R1 is connected to rectifier R1. The opposite ends of resistances R1 and R2 are connected together and to one end of a third resistance R3, the other end of resistance R3 being connected to the line L. Across resistance R3 an additional alternating voltage is fed from the source Q to each rectifier circuit. Between the points *a* and *b* appears an alternating voltage whose amplitude and phase, related to the phase of the alternating voltage supplied by the source Q, are characteristic of the amount and sign respectively of the difference between the transmitter frequency and the characteristic frequency of this reference resonator. This alternating voltage is fed over the transformer T2 as a first input to the phase discriminator PD. The second input to this discriminator is constituted by alternating voltage of the source Q. The phase discriminator generates a regulating output voltage which influences the transmitter frequency, after suitable filtering in the network N, in series with the modulating alternating voltage.

The switch arrangement described so far yields a stabilization of the mean transmitter frequency. If a negative feedback is desired for all interfering influences occurring in the modulating frequency range, the frequency of the additional alternating voltage from the source Q must be selected high compared to the highest modulating frequency (preferably at least 100 times greater) and the time constant of the network N must be kept correspondingly smaller. Under these conditions, however, the negative feedback for the modulating signal is just as great, so that a modulation of the transmitters is not possible at all or only to a very limited extent.

According to the invention, the modulating signal is fed over the transformer T1 not only to the transmitter S but also to the rectifier circuits over the two-coil choke D and one half each of the primary winding of the transformer T2. The circuit for the modulating signal closes over the two rectifiers G1, G2, connected in series with opposite directions of passage. If the amplitude of the modulating signal introduced into the rectifiers is so dimensioned and its phase so selected that the modulating signal obtained by demodulation in the discriminator is exactly compensated, the modulating signal is missing in the output voltage of the phase discriminator. The interfering negative feedback for the modulating signal is thus eliminated.

If the amplitude of the modulating signal introduced into the rectifier circuits is smaller than assumed above, a modulating component will appear in the regulating voltage which adds up in the sense of the negative feedback to the modulating signal fed to the transmitter. The reverse is true for greater amplitudes. The switch arrangement according to the invention has thus the advantage that it eliminates not only all interfering modulations, but that it is also stabilizes the frequency fluctuations of the useful modulation, and that it linearizes the modulation characteristic. The interfering influences are thus eliminated to a great extent by variations in the modulation characteristic of the transmitter, as they always occur because of the aging of tubes. When using the ordinary regulating factors of 40–50 db, the modulation slope and thus the frequency fluctuation are determined substantially only by the amplitude of the modulating signal fed to the rectified circuits and practically no longer by the slope of the modulation characteristic of the transmitter.

For an upper limit of the modulating frequency range of 50 kc., for example, the frequency of the alternating voltage from the source Q is preferably 5–10 mc. Regulating time constants in the order of one microsecond can then be achieved.

The invention makes it possible to build the feeding devices for the transmitter considerably simple and thus cheaper, since the quality of the frequency modulated oscillation produced is practically no longer disturbed by hum and voltage fluctuations.

It is even possible to use in the transmitter a klystron heated with alternating current. Often it will be possible to omit the so-called uni-line, normally provided between the transmitter and the antenna, because the effect of a variable antenna feedback on the transmitter is also compensated by the switch arrangement according to the invention.

Practically the same effect is also obtained if the current fed from the modulating signal source to the rectifier circuits traverses the two rectifiers in parallel, while they are connected in series, seen from the source of the additional alternating voltage. To this end the lines would have to be conducted from the source Q of the drawing to the center of the primary winding of the transformer T2. The modulating signal supplied by the upper secondary winding of the transformer T1 has to be applied to the connecting points between the resistances R1 and R2 on the one hand, and to the ground on the other hand. It suffices then to use instead of the two-coil choke D an ordinary choke in the ungrounded line.

I claim:

1. In a circuit arrangement for stabilizing the frequency of a frequency-modulated self-excited transmitter, the combination comprising a modulating voltage source connected to said transmitter, a line at one end of which is fed the oscillations from said transmitter to be stabilized, a reference resonator closing the other end of said line, a pair of rectifiers connected to said line such that high frequency voltages proportional to the sum and difference respectively of the wave voltages running back and forth on said line are applied to said rectifiers, a pair of resistances connected at one end each to said rectifiers, the other ends of said resistances being connected to each other and to a third resistance connected to a source of an additional alternating voltage, a transformer having a pair of primary windings which are connected on the one hand to said rectifiers and on the other hand to said modulating voltage source and having a secondary winding which is connected as one input to a phase discriminator, said additional alternating voltage source being connected to said phase discriminator as a second input thereto, the output of said phase discriminator providing a regulating signal which influences the frequency of said transmitter.

2. In a circuit arrangement for stabilizing the frequency of a frequency-modulated self-excited transmitter, the combination comprising a modulating voltage source connected to said transmitter, a line at one end of which is fed the oscillations from said transmitter to be stabilized, a reference resonator closing the other end of said line, a pair of rectifiers connected to said line such that high frequency voltages proportional to the sum and difference respectively of the wave voltages running back and forth on said line are applied to said rectifiers, a pair of resistances connected at one end each to said rectifiers, the other ends of said resistances being connected to each other and to a third resistance connected to said modulating voltage source, a transformer having a pair of primary windings which are connected on the one hand to said rectifiers and on the other hand to an additional alternating voltage source and having a secondary winding which is connected as one input to a phase discriminator, said additional voltage source being connected to said phase discriminator as a second input thereto, the output of said phase discriminator providing a regulating signal which influences the frequency of said transmitter.

References Cited in the file of this patent

UNITED STATES PATENTS 2,789,210 Arnold ---------------- Apr. 16, 1957